United States Patent
Balasubramaniam et al.

(10) Patent No.: US 6,477,550 B1
(45) Date of Patent: Nov. 5, 2002

(54) METHOD AND SYSTEM FOR PROCESSING EVENTS RELATED TO A FIRST TYPE OF BROWSER FROM A SECOND TYPE OF BROWSER

(75) Inventors: Chandrasekar Balasubramaniam, Sunnyvale, CA (US); Ravi Kannan, Sunnyvale, CA (US); Srivats Sampath, San Jose, CA (US); Babu Katchapalayam, Santa Clara, CA (US)

(73) Assignee: Mcafee.com Corporation, Santa Clara, CA (US)

(\*) Notice: Subject to any disclaimer, the term of this patent is extended or adjusted under 35 U.S.C. 154(b) by 0 days.

(21) Appl. No.: 09/270,107

(22) Filed: Mar. 16, 1999

(51) Int. Cl.⁷ .......................... G06F 17/00; G06F 15/00; G06F 9/46; G06F 9/00; G09G 5/12
(52) U.S. Cl. .................. 707/513; 707/500.1; 707/501.1; 707/526; 709/310; 709/312; 709/313; 345/748; 345/749
(58) Field of Search .............................. 707/513, 501.1, 707/500.1, 516, 526, 530; 709/313, 310, 312; 345/748, 749

(56) References Cited

U.S. PATENT DOCUMENTS

| | | | | |
|---|---|---|---|---|
| 5,794,259 | A | * | 8/1998 | Kikinis ........................ 345/810 |
| 5,960,170 | A | | 9/1999 | Chen et al. ............. 395/183.14 |
| 6,253,234 | B1 | * | 6/2001 | Hunt et al. ..................... 707/10 |
| 6,266,681 | B1 | * | 7/2001 | Guthrie ........................ 707/10 |
| 6,343,377 | B1 | * | 1/2002 | Gessner et al. ............. 707/513 |
| 6,363,433 | B1 | * | 3/2002 | Nakajima .................... 709/313 |

OTHER PUBLICATIONS http://www.mcafee.com, Home—The Place for Your PC, one page, Aug. 9, 1999.
http://www.mcafee.com, Clinic—McAfee Clinic, one page, Aug. 9, 1999.

(List continued on next page.)

Primary Examiner—Joseph H. Feild
Assistant Examiner—Rachna Singh
(74) Attorney, Agent, or Firm—Silicon Valley IP Group, LLC; Kevin J. Zilka; Christopher J. Hamaty (57) ABSTRACT

A method and system for detecting the presence of a plug-in on a client computer; and if the plug-in is not present, downloading the plug-in to the client computer; loading the plug-in into a browser running on the client computer and processing events generated on the client computer using the code contained in the plug-in.

17 Claims, 4 Drawing Sheets

OTHER PUBLICATIONS htpp://www.mcafee.com, Clinic—Coming Soon, one page, Aug. 9, 1999.

http://www.mcafee.com, Clinic—Optimize Performance, one page, Aug. 9, 1999.

http://www.mcafee.com, Clinic—Clean Hard Drive, one page, Aug. 9, 1999.

http://www.mcafee.com, Clinic—Software Update Finder, one page, Aug. 9, 1999.

http://www.mcafee.com, Clinic—Fees for McAfee Clinic Premium Services, two pages, Aug. 9, 1999.

http://msdn.microsoft.com, COM Techniques by Panther Software, Introduction, two pages, Aug. 9, 1999.

http://msdn.microsoft.com, The ABCs of MFC ActiveX Controls, 31 pages, Aug. 9, 1999.

http://msdn.microsoft.com, Web Workshop—Signing and Marking ActiveX Controls, 9 pages, Aug. 9, 1999.

http://msdn.microsoft.com, Web Workshop—ActiveX Controls Overview, two pages, Aug. 9, 1999.

http://www.microsoft.com, About Microsoft COM, two pages, Aug. 9, 1999.

http://www.microsoft.com, Component Object Model (COM), two pages, Aug. 9, 1999.

http://msdn.microsoft.com, The Component Object Model: A Technical Overview, 19 pages, Aug. 9, 1999.

http://msdn.microsoft.com, The COM Programmer's Cookbook, 67pages, Aug. 9, 1999.

http://msdn.microsoft.com, Events vs. Callbacks, two pages, Aug. 9, 1999.

http://msdn.microsoft.com, Developing Applications with OLE 2.0, 20 pages, Aug. 9, 1999.

http://msdn.microsoft.com, What OLE is Really About, 45 pages, Aug. 9, 1999.

http://msdn.microsoft.com, OLE for Idiots: A is for Attitude, 7 pages, Aug. 9, 1999.

http://msdn.microsoft.com, OLE for Idiots: B is for Beginning, 8 pages, Aug. 9, 1999.

http://msdn.microsoft.com, OLE for Idiots: C is for Container, 33 pages, Aug. 9, 1999.

http://msdn.microsoft.com, OLE for Idiots: D is for Dragon, 12 pages, Aug. 9, 1999.

http://msdn.microsoft.com, OLE Property Sets Exposed, 26 pages, Aug. 9, 1999.

http://msdn.microsoft.com, OLE Integration Technologies: A Technical Overview, 20 pages, Aug. 9, 1999.

htpp://msdn.microsoft.com, Notes on Implementing an OLE Control Container, 66 pages, Aug. 9, 1999.

http://home.netscape.com, Technical Specifics, 1 page, Aug. 11, 1999.

wysiwyg://3/http://home.netscape.com, Browser Plug–ins, 2 pages, Aug. 11, 1999.

http://developer.netscape.com, What's New in JavaScript 1.2, 5 pages, 10/97.

wysiwyg://142/http://msdn.microsoft.com, Window Procedure Subclassing, 1 page, May 28, 1999.

http://developer.netscape.com/docs/manuals/communicator/jsguide/intor.htm, Introduction, 8 pages, Aug. 11, 1999.

http://www.marimba.com, Castanet2.1 Tuner.

* cited by examiner

```
<!-- begin the OBJECT tag, understood by ActiveX-capable browsers -->
->
<OBJECT> CLASSID="clsid:166B1BCA-3F9C-11CF-8075-4455354000"
CODEBASE="http://active.macromedia.com/director/cabs/sw.cab#version=6,0,0,0"
WIDTH="220" HEIGHT="110" NAME="moviename" >

<PARAM NAME="Movie" VALUE="mymovie.dcr">
<!-- begin the JavaScript -->

<SCRIPT LANGUAGE="JavaScript">

<!-hiding contents from old browsers

//If this browser understands the mimeTypes property and recognizes the MIME Type //"application/x-director"...

if (navigator.mimeTypes && navigator.mimeTypes["application/x-director"]){
//...write out the following <EMBED> tag into the document.
//...make sure there are no line breaks within the EMBED tags.

document.write('<EMBED SRC="mymovie.dcr" WIDTH="220" HEIGHT="110" ');

}
//Otherwise,...

else {

//...write out the following <IMG> tag into the document. The image
// need not be the same size as the Director movie, but it may help
// you lay out the /page if you can predict the size of the object
// reliably.

document.write('<IMG SRC="welcome.gif" WIDTH="220" HEIGHT="110" ALT="Non-Shockwave Welcome">');
}
//Done hiding from old browsers. -->
</SCRIPT>
<!-- Close the OBJECT tag. -->
</OBJECT>
```

FIG. 3

METHOD AND SYSTEM FOR PROCESSING EVENTS RELATED TO A FIRST TYPE OF BROWSER FROM A SECOND TYPE OF BROWSER

FIELD OF THE INVENTION

The present invention relates to computer networks. More specifically, this invention is related to activating and executing software objects downloaded over a communications network.

BACKGROUND OF THE INVENTION

The public data networks, commonly known as the Internet and colloquially known as the web, can be used to deliver not only electronic mail messages and web pages, but also software objects from a server computer to client computers connected to the Internet.

The Internet is a collection of interconnected computer networks, in which some computers are configured to function as server computers. Some other computers, which function as client computers, access data and other information available on the server computers. Typically, this access is done by means of a request-response sequence. The client computer sends a request message to the server computer, which responds to the request by sending a response message to the client computer. The client computer can be configured to send such request messages via a software program called a web browser, running on the client computer. If the response message from the server computer is an encoded message, such as a Hyper-Text Markup Language (HTML) encoded message, it can be displayed in a browser window at the client computer if the browser is programmed to interpret the response message.

The description of a preferred embodiment is better understood in the context of the terms web browser, a plug-in and a MIME-type. As mentioned above, a web browser or simply a browser is a program that runs on a user's computer and allows the user to access the vast resources of information available on the Internet. Examples of browsers are those marketed by Netscape Corporation, of Sunnyvale, Calif., and Microsoft Corporation of Redmond, Wash. The browser provides a "window" to the Internet. Typically, a browser provides an area where a user types an address—in a format called Universal Resource Locator (URL)—indicating the source of the information. The browser then sends a message to a web site indicated by the address and requests the web site to send the information in a response message as explained before. When a server computer at the web site responds to the request with a response message that contains a web page, the browser receives the response message, deciphers the message and displays the web page contained in the message on the user's computer.

In general, manufacturers of browser programs provide only a limited number of facilities. There could be a need to provide enhanced functionality of the browser program in order to perform other functions such as display a moving image, play a voice message etc. Browser manufacturers such as Netscape provided users with utility programs known as "helper applications" to perform supplemental functions to enhance their browsers. However, these "helper applications" required the opening of a new window on a user's computer.

A plug-in is a piece of software program that enhances the functionality of a web browser. In general, a plug-in is developed and marketed by companies other than those who manufacture web browsers. Some plug-ins allow other types of communication media to be delivered and displayed on a browser, or they impart animation or dynamic imagery to the contents of the Internet. Examples of vendors of such plug-ins are: Shockwave®, Real Networks®, ISYS™, Adobe® and others. A plug-in program typically includes a content player component analogous to a video cassette player for presenting information from a content file, or for performing other custom actions responsive to the information from a content file. A user typically uses a browser to visit a web site and downloads the plug-in from the web site and installs it. The process of installation of a plug-in typically makes the plug-in accessible to a browser program. Then, the user can play a downloaded content file—which is analogous to a video cassette of a movie—using the Internet and the browser as delivery mechanisms. In contrast to a "helper application," a plug-in application—if it is installed in a browser, for example, by launching the browser anew—is recognized automatically by the browser and its function is integrated into the main HTML file that is being presented. Thus, the advantage of a plug-in is that it can be integrated into a browser without changing the browser's user interface. For a list of plug-ins available for a Netscape browser, see Browser Plug-Ins, dated 1999, (visited Mar. 2, 1999), <http://home.netscape.com/plugins/index.html>.

MIME stands for Multi-purpose Internet Mail Extension. MIME types specify the type of data contained in a file downloaded by a browser. In order to transmit a file of a particular type of data via a browser, the file type must be supported by a web server that hosts the file. In order for MIME to work properly, the type of the file and its file-name extension must be properly identified. Some commonly used MIME types are as follows:

| Content type/Subtype | File extension |
| --- | --- |
| text/html | html, htm |
| text/plain | txt |
| image/gif | gif |
| image/jpeg | jpg, jpeg |
| audio/x-realaudio | ra |
| audio/midi | midi |
| audio/x-wav | wav |
| audio/basic | au |
| movie/x-quicktime | mov |
| application/pdf | pdf |
| application/postscript | ps |

MIME types work as follows. When a file with extension or suffix ".htm" or ".html" is identified by a web server, the file is assumed to be of type "html" available in American Standard Code for Information Interchange (ASCII) "text" format. The server sends this information to a browser in the response message to the browser. Typically a Common Gateway Interface (CGI) program that outputs the contents of a URL to a browser is encoded as follows in the first line that is output, identifying the message being sent.

Content-type: text/html

Thus, MIME works by attaching a "header" to each message transmitted. The header contains the content type and subtype of the data contained in the message. This allows the server and browser to serve and present each message correctly. It also allows users to create pages that combine messages with different data types; for example, one could create an HTML document that has both image and sound files within it.

A browser that receives such a message understands how to interpret the content and use the appropriate code to decipher the message to present it to a user. Typically, browsers use MIME types to invoke an appropriate plug-in program. For example, suppose a user requests downloading a QuickTime™ movie. The browser receives the movie as a file whose name ends with the suffix or extension ".mov" and whose data is identified as the MIME type for Quick-Time™. When the browser receives this file, it notes that the MIME type of QuickTime™, and takes the action appropriate for that MIME type. If the browser is configured to launch a QuickTime™ player—which is available as a plug-in application—every time it receives a file with the QuickTime™ MIME type, the browser will automatically do so every time a user downloads a QuickTime™ movie. For more information on MIME types can be obtained from the web page entitled "MIME Documentation," dated 1999, (visited Mar. 2, 1999), <http://home.netscape.com/assist/helper_apps/mime.html>.

A web browser can also be used as a vehicle to distribute software objects to a client computer. The details of how this can be achieved are disclosed in a commonly-owned U.S. patent application, Ser. No. 09/208,735, filed Nov. 13, 1998, which describes a method and system for securing, managing and optimizing a computer, the contents of which are hereby incorporated by reference into the present application. Disclosed therein are ways to download a software object over a communications network and execute the object from a remote location such as a remotely located server computer over the network. It is stated in that application that to achieve the goals stated therein, a preferred embodiment envisions a browser enabled to support delivery of objects that can be remotely executed, as exemplified by a technology architecture such as Component Object Model (COM), proposed by Microsoft Corporation.

COM is a software architecture that allows the creation of applications from components of software. COM can be viewed as an architectural foundation upon which other software services with more complex superstructures can be built. An added advantage is that the superstructures can be changed, such as when a newer version of software is created, without having to change the foundation. It provides the mechanisms such as a binary standard for function calls between components and a uniform way to allow applications to call each other via devices called interfaces, which can be reused. More information on COM can be obtained from the web page "The Component Object Model: Technical Overview," dated 1996, (visited Feb. 25, 1999), <http://www.microsoft.com/com/wpaper/Com_mod1.asp>.

Some commercially available browsers, however, do not support a technology similar to COM. Noteworthy among the browsers that do not support a COM-like architecture is the browser marketed under the name Navigator version 4.0 by the Netscape Corporation, of Sunnyvale, Calif. Additionally, browsers that are marketed by some vendors make available a number of user-friendly features to create a customized user interface. If a user uses a different browser program than the one that is configured to access the customized user interface, the user is inconvenienced.

Because of the differences in the features supported by the various browsers, providers of software applications configure their web sites to support only one or the other versions of browsers. Alternatively, operators of web sites or vendors who wish to market software that works on browsers available from different vendors write the same software for each browser type. This increases the cost of software development. Additionally, this places several restrictions on the ways to design the software that can function on browsers of different types.

Thus, today, a provider of software objects has two choices: either he can limit his business to provisioning products and services only to those users that use a browser configured to support a COM-like architecture; or he can write the same software or services in to suit the peculiarities of browsers manufactured by different vendors. This situation can be greatly improved if there is available a system and method to allow a software vendor to provide standard applications or services to a user of a client computer without regard to whether or not the browser executing on the client computer is configured to support a certain architecture.

SUMMARY OF THE INVENTION

In accordance with a preferred embodiment, a method and system for using features of one browser in conjunction with the features of another browser is provided. In one aspect, the method includes a server computer programmed to detect if a first type of browser was being used when a client computer connects to the server computer. If the client computer used a second type of browser, then the server computer is configured to detect whether a plug-in program is downloaded and installed on the client computer; and if the plug-in is not present on the client computer, to download and install the plug-in on the client computer. In a yet another aspect, the preferred embodiment is directed to loading and installing the plug-in into a browser running on the client computer, and transferring control of the browser execution thread to an instruction sequence contained in the plug-in. In a further aspect, the preferred embodiment is directed to intercepting and sub-classing the events generated in the browser.

In a preferred embodiment, in another aspect, is directed to a plug-in program, which upon downloading to a client computer and installed into a browser running on the client computer, is configured to transfer control of the execution of the browser to code contained in the plug-in temporarily. In another aspect, the plug-in is configured to intercept events generated in the browser and process them according to the instructions contained in the plug-in. In this manner, the plug-in is configured to enable the execution of a program written for a browser that supports a COM-like architecture within the browser which is not configured to support the COM-like architecture.

DESCRIPTION OF THE DRAWINGS

These and other objects, features and advantages of the invention will be more readily apparent from the following detailed description of a preferred embodiment in which:

FIG. 3 is a sample program code to using a plug-in.

DETAILED DESCRIPTION OF THE PREFERRED EMBODIMENTS

Figure 1:
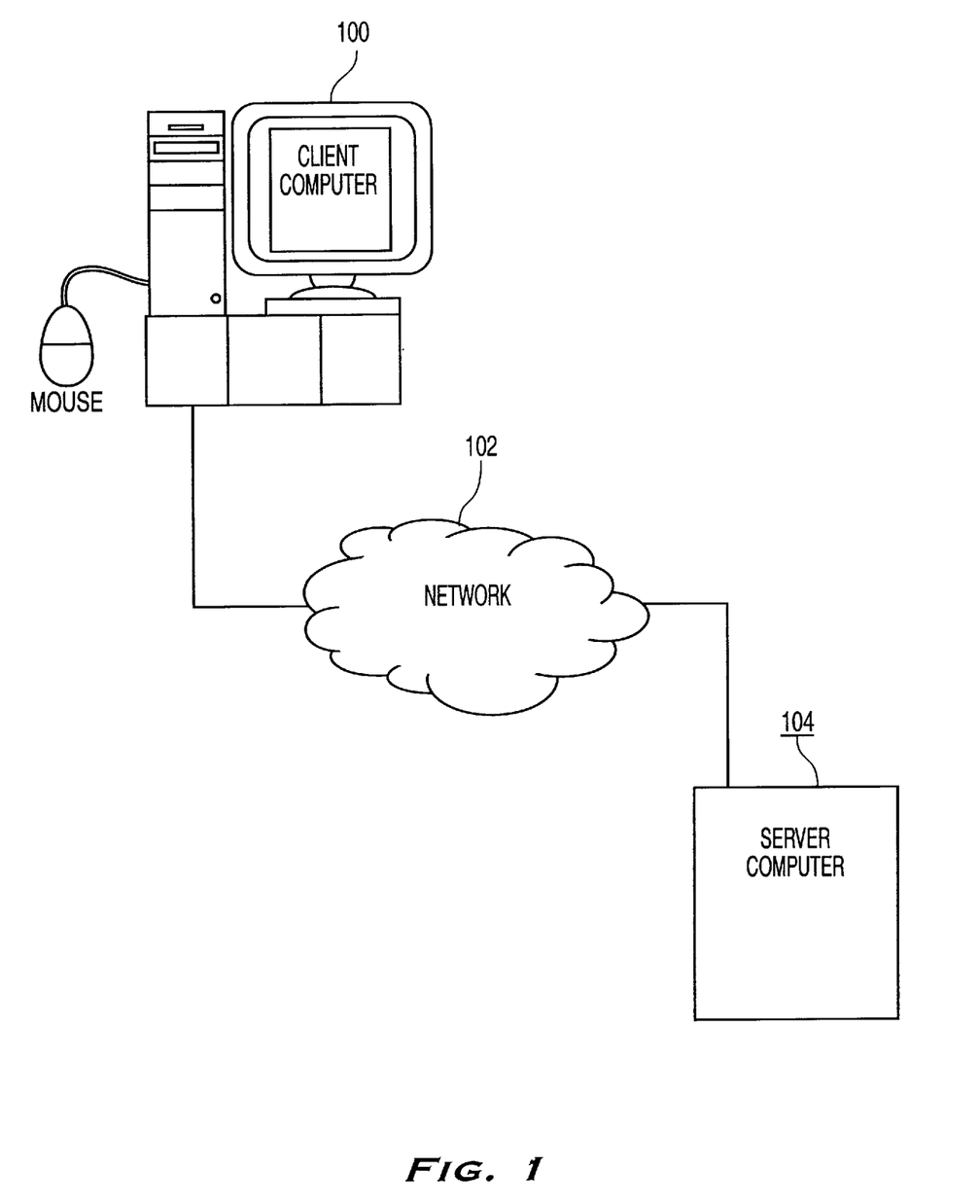
FIG. 1 shows an illustrative architecture of interconnected computers in which the present invention can be practiced.

Now referring to FIG. 1, a client computer 100 is connected to a communications network such as the Internet 102. The client computer 100 includes a processor, such as a Pentium® II microprocessor, memory such as semiconductor memory, display device such as a CRT or flat-panel display, input device such as a keyboard or mouse, storage device such as a hard disk, and a communications interface device such as a modem or an Ethernet adapter to connect the client computer 100 to the network 102. In a preferred embodiment, the client computer 100 is equipped with an operating system such as the Windows-98™ operating system, a browser program such as Navigator™ marketed by the Netscape Corporation, Sunnyvale, Calif. Additionally, the client computer 100 is equipped with software programs such as a Transmission Control Protocol/Internet Protocol (TCP/IP) stack to connect to the Internet 102 either directly using a Local Area Network (LAN) connection or indirectly via the communications interface device. Advantageously, such a connection to the Internet 102 can be achieved by the user first connecting to an Internet Service Provider (ISP) such as America Online or Erols, Inc. Typically, a user first dials over the regular Plain Old Telephone Service (POTS) telephone line using a modem connected to his client computer 100 and establishes a packet switched connection with a computer at the ISP.

Also connected to the Internet 102 is a server computer 104, which is operated by a Downloadable Software Provider (DSP) such as McAfee Associates, Inc. of Sunnyvale, Calif. The server computer 104 includes a processor such as a Compaq® Alpha™ microprocessor, a storage device such as a disk drive, an interface device such as a modem or an Ethernet adapter to connect the server computer 104 to the Internet 102. The server computer 104 is programmed to function as a web server and includes server-side computer programs like an operating system such as a Windows-NT™ or Unix™ operating system, a web server software package such as the server software available from Apache™ or the Netscape Corporation and software programs such as Common Gateway Interface (CGI) programs and related files. The server computer 104 is preferably connected to a database 106 such as the Relational Database Management System marketed by the Oracle® Corporation.

While in the preferred embodiment, the client computer 100 and the server computer 104 are single computers, it should be evident to one skilled in the art that one or both of the client computer and the server computer can comprise multiple computing platforms which are, for instance, networked together or otherwise clustered. In addition, the software described herein may be executed entirely on either the client or the server computer, or may even be partially executed on both computers.

The preferred embodiment is directed to a method of accessing the capabilities of a browser program configured in a first manner—for example, to support a COM-like architecture—by using a second browser program that is configured differently—i.e., the second browser does not support a COM-like architecture. Though the description herein uses a browser that can support a COM-like architecture, this should be viewed only as an illustration of the principles of the invention and not as a limitation.

Figure 2A:
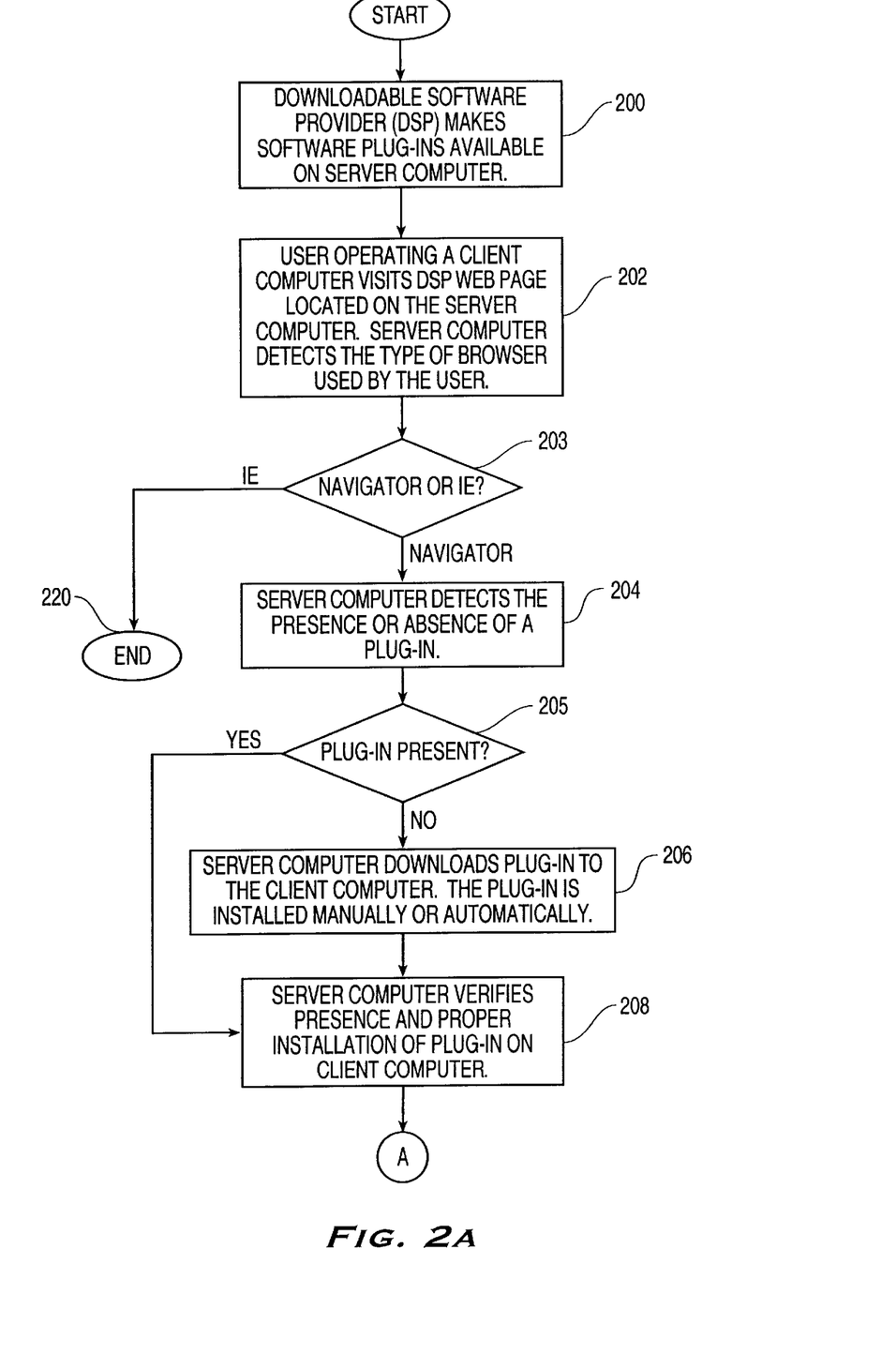
FIG. 2 is a flow chart showing steps performed by an illustrative preferred embodiment of the invention.
Figure 2B:
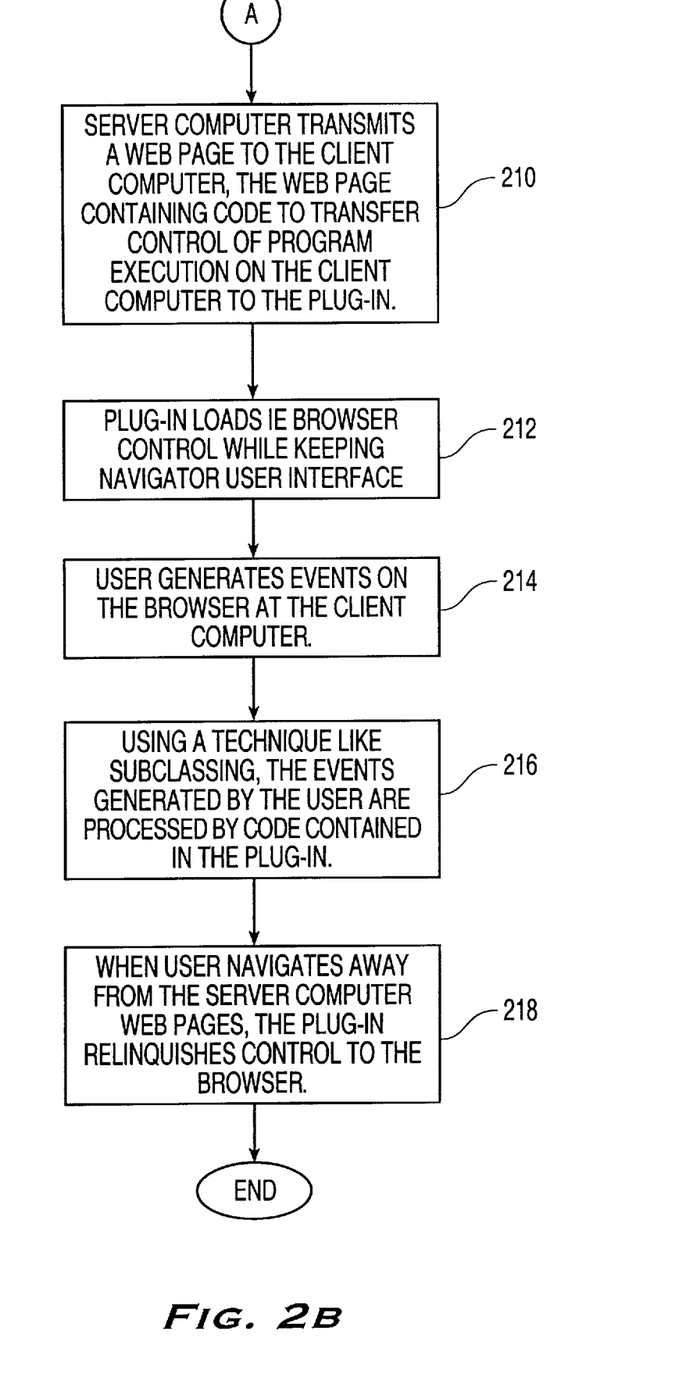

Referring to FIG. 2, during an initial step, the DSP creates a web page on a server computer 104 and makes available certain software components packaged in a COM-like manner. These software components are configured to be downloaded to a client computer 100 via the Internet 102. Preferably, the software components are downloaded with no user action other than a mere "visiting" the server computer 104 web pages using a browser of the first kind. Advantageously, the browser of the first kind is Internet Explorerm (IE) browser marketed by Microsoft Corporation. Assume also that the web page contains information that can be downloaded and executed within an environment such as COM provided by IE. (Step 200).

Assume that a user operating the client computer 100 visits the server computer web page using a browser program of the second kind, illustratively, the browser Navigator™ marketed by Netscape Corporation. The server computer 104 is programmed to detect the type of browser a user uses when visiting the server computer web page. (Step 202). The server computer 104 is programmed to determine whether the browser used by the user at the client computer 100 is Navigator or IE. (Step 203).

If the browser running at the client computer 100 is IE, there being no need for an IE-emulating browser plug-in to be downloaded to the client computer 100, the server computer 104 proceeds with a normal browsing operation. (Step 220).

If, on the other hand, the user is determined to have visited the server computer with the browser program Navigator, the server computer 104 detects whether a particular plug-in program is already installed in the client computer 100. A preferred embodiment uses the JavaScript™ programming language to detect this as follows. Other embodiments may use ActiveX™ or other programming techniques to perform the same function. The Navigator program contains attributes—called "properties"—which can be accessed using the JavaScript programming language. Two relevant properties are:

navigator.mimeTypes ["type"]
navigator.plugins ["name "]

Figure 3:
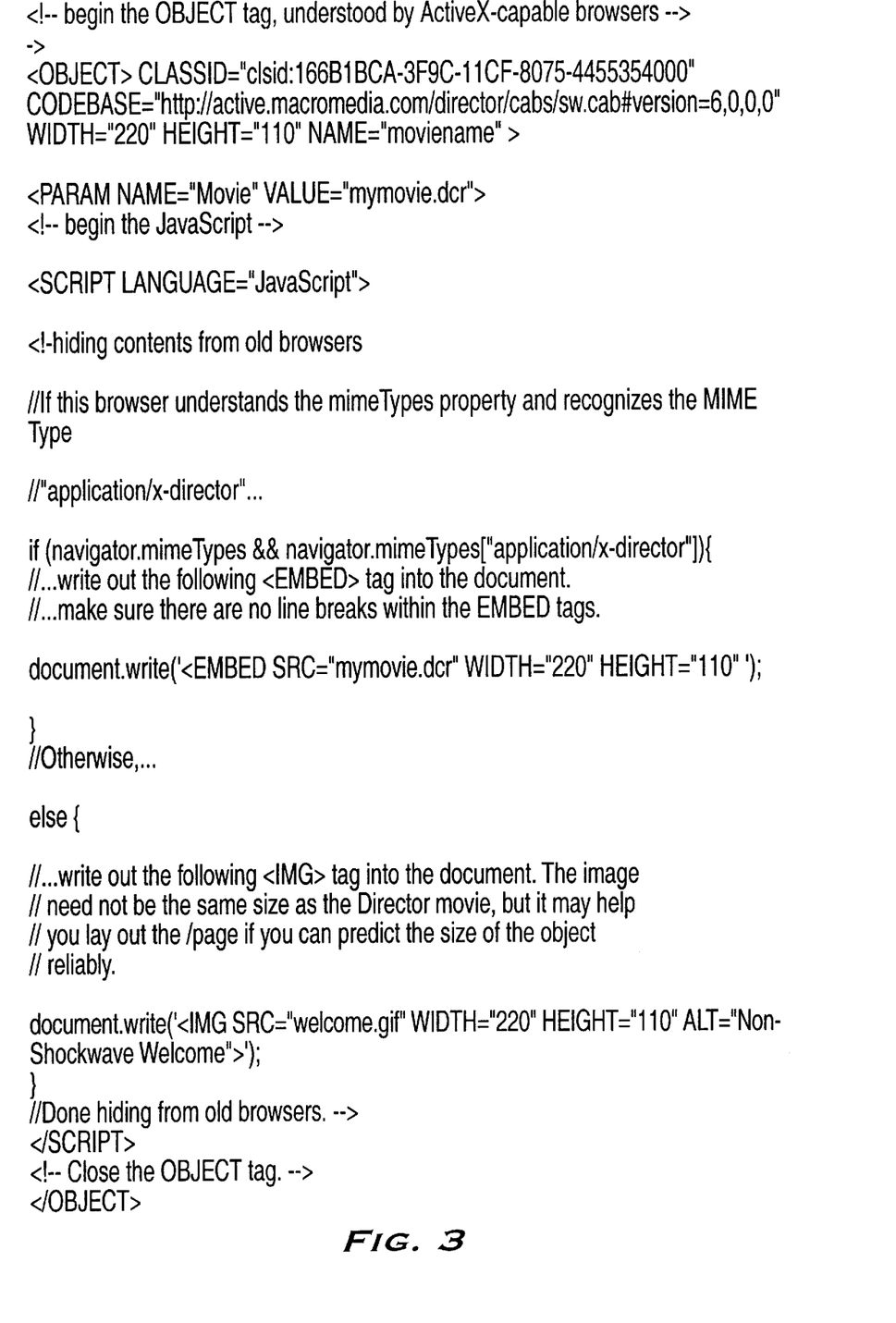

By using these properties, or by searching a pre-designated directory such as the PLUG-IN directory in the client computer 100, the server computer 104 determines if the client computer 100 is configured to support a particular MIME type or a plug-in. A sample program to perform such detection of a shockwave plug-in is provided in FIG. 3 to illustrate a method. By executing a program such as the one provided in this illustration, the server computer 104 determines if a particular plug-in is installed on the client computer 100. (Step 204).

A branching instruction set is executed at the server computer 104 upon obtaining the information whether the plug-in is present or absent according to step 204. If the plug-in is not present in the client computer 100, step 206 is executed. If, on the other hand, the plug-in is present, step 208 is executed. (Step 205).

As stated, if the client computer 100 does not have the particular plug-in installed, the client computer 100 is presented with a second web page from which the user can download the plug-in. Advantageously, the client computer 100 manually downloads the plug-in after filling out a form displayed on the second web page. In other embodiments, the plug-in could be automatically downloaded to the client computer 100. Preferably the downloaded plug-in is installed in a PLUG-IN directory on the client computer 100 so that its presence can be verified if the user visits the server computer 104 web page a second time. (Step 206).

After the plug-in is installed, the user is prompted to restart his Netscape browser program and visit the server computer 104 web page. When the user does so, a verification of a successful installation of the plug-in is made. (Step 208).

After the verification of a particular plug-in, the server computer 104 transmits a third web page to the client computer 100. Code contained in the third web page is configured to transfer the control of program execution to the plug-in when the third web page is downloaded to the client computer 100. (Step 210).

The plug-in is configured to load the IE browser or portion thereof on the client computer 100. Preferably this loading is done without changing the user interface provided by the Navigator browser. All the navigational elements such as tool bar buttons, icons, and the general framework of the browser appearance is that of the Navigator. The fact that the client computer 100 is executing a different browser—in this case, IE—while using the user interface of the Navigator browser is hidden from the user. (Step 212).

From this point onwards the browser that is executing on the client computer uses elements or features from both the browsers, IE and Navigator. Advantageously, the plug-in includes an IE control component which incorporates a feature particular to IE. When a user makes a navigational request for a web page or other purpose, the user performs certain actions such as entering text in a text form, clicking or double-clicking on a portion of a web page displayed on the browser such as on a hyper link and the like. These actions generate events that can be captured and processed by the IE control component incorporated into the Navigator browser program running on the client computer 100. (Step 214).

When a client computer displays a web page, a user may use an attached input device such as a mouse or a key board to instruct the browser to perform further actions such as accessing other web pages for which links are provided in the displayed web page, or download and play an audio or video stream embedded in the web page. These actions performed by a user create what are known in the client-server computing jargon as "events," which can be acted upon by code in a computer, if the computer is configured to do so.

In general, events can be tracked by code embedded in a browser. As stated, an event can be a result of an activity or inactivity on the part of a user of a client computer. For example, the act of pressing a mouse button on a pushbutton object on a web page can be interpreted by the browser as a Button Press event. Similarly, a time out condition that resulted from inactivity by a user may be interpreted by the browser as a Time Out event. When instructed by a proper set of instructions, a browser or other piece of software that is enabled to handle the various events may be adapted to either identify or to act upon the happening of certain events.

Typically, the action taken by a browser upon the occurrence of a specified event is encoded in a set of software instructions, preferably encapsulated in a sub-routine, called an event handler. In some cases, an abnormal or unwanted event may happen. An example of an unwanted event is that the browser may not be able to access sufficient memory to load a large graphical image to display on the display device. Such unwanted or abnormal events are typically called "exceptions." A browser can be programmed to handle these exceptions. A set of computer instructions that is executed automatically upon the occurrence of an exception is called an exception handler.

A browser that is enabled to capture and handle events and exceptions functions in the following way. First a user generates or causes an event, such as a "key press" event, a "timeout" event or a "button click" event. When such an event occurs, it must be first "captured" by the software contained in the browser. In the programming vernacular, events are "captured" whereas exceptions are "caught" or "trapped." In order for an event to be captured, the browser must be programmed to do so. This is typically done in the instruction sequence embedded in the web page. When an event occurs, if the web page is encoded with instructions to handle the event in a certain way, the browser will execute the instructions. As an illustration, the browser Netscape® Navigator™ allows the capturing of the following events in the JavaScript™ 1.2 compatible version:

Click—occurs when a user clicks a link or form element.

DblClick—occurs when a user double-clicks over a link or form element.

DragDrop—occurs when a user drops an object onto a Navigator window.

KeyDown—occurs when a user depresses a key.

KeyPress—occurs when a user presses or holds down a key.

KeyUp—occurs when a user releases a key.

MouseDown—occurs when a user depresses a mouse button.

MouseMove—occurs when a user moves the cursor.

MouseOut—occurs when a user moves the cursor out of an object.

MouseOver—occurs when a user moves the cursor over an object.

MouseUp—occurs when a user releases a mouse button.

Move—occurs when a user or script moves a window.

Resize—occurs when a user or script resizes a window.

Some events, such as a "button click" event result in a pre-programmed "default" action. For example, if a "button click" event occurs on an active Universal Resource Locator (URL) link embedded in a web page, the default action for such an event could be to cause the browser to communicate with a web server identified by the URL and download the web page pointed by the URL. Browser defaults are generally pre-programmed so that actions occur without the need for special programming instructions included in the web page. By embedding code in a web page to handle events, however, the browser default actions can be overridden (i.e., browser can be instructed to perform other actions than the default actions), interrupted (i.e., before the browser default action is performed, some special instructions can be executed) or followed-through (i.e., after the browser default action, special instructions can be executed).

In general, an event is internally represented in a computer memory as an event data structure or, in an object-oriented implementation, an event object. An event handler is implemented in the form of a set of instructions that operate on the event data structure or object. In some browsers, once the browser default action is completed, the event data structure or object is lost, i.e., the contents of this data structure or object are not guaranteed to contain the details of the generated event. This is a first event model. In such browsers, the event handler must interrupt the processing of the default action in order to execute special event handling instructions. In some other browsers, incorporating a second event model, the event data structure or object is preserved for further processing. In the case of such browsers, the event handler need not interrupt the default action; execution of the event handling instructions as a follow-through is possible. Depending on the implementation of a browser, the handling of events can be done in any one or more of the above three methods.

The foregoing is better explained with the help of an illustration. We assume that an event-enabled browser can handle events like clickOn (to generate a CLICK_ON event when a mouse is clicked on a pre-designated area of a web page that is displayed on the browser), mouseON (to generate a MOUSE_ON event when a mouse is moved to a pre-designated area of a web page) and KeyPress (to generate a KEY_PRESS event when a key board button is pressed while a web page is displayed on a computer screen). The invented system enhances the browser functionality and the web page with the addition of a set of software instructions to capture these events and write to a log file either located in memory 112 or on the storage device 116. When a user clicks a mouse button when the mouse points to a pre-designated portion of the web page, a CLICKON event is identified by the browser. The invented system then captures the event, and makes an entry in the log file for usage by a usability tester. After the recording the event in a log file, the event is "let go," i.e., "released" so that the action corresponding to the CLICKON event is executed.

As stated, it is generally the case that events generated within a browser program are acted upon by subroutines or classes within the same browser program environment. A computer running a browser program, however, can be configured to capture events generated within the framework of a browser program and process them according to event handlers that are extraneous to that browser program. This technique is called subclassing, whereby an extraneous program code to intercept the events that are captured by a program and process them according to the instructions provided in the extraneous program code. More information on the events and the way in which they are captured and processed by the Navigator browser can be obtained from "What's new in JavaScript 1.2," dated January 1997, (visited Dec. 1, 1998), <http://developer.netscape.com/docs/manuals/communicator/jsguide/js1_2.htm>. Subclassing is explained in a document entitled "Window Procedure Subclassing," dated 1998, (visited Mar. 3, 1999), <http://premium.microsoft.com/msdn/library/sdkdoc/winui/winprocs_5u93.htm>.

When a user's actions—and sometimes inaction, such as a timeout condition—generates events, they are captured and stored in a memory device by the Navigator browser. The IE control component included in the downloaded plug-in is programmed to intercept these events and act upon them using the code associated with IE control component code which is loaded according to step 212. Since the IE control component is developed using a COM-like architecture, these features can be utilized by the DSP in providing its software and services. The user, on the other hand, is still under the impression—provided by the Navigator user interface—that he is working with the Navigator and not IE, while benefitting from the features of IE. (Step 216).

When the user navigates away from the server computer 104 web pages, the plug-in is configured to relinquish control of the browser program execution and a normal browser functionality can be restored. (Step 218).

Thus, a technical advance is achieved as described in the preferred embodiment wherein features of programs developed by different vendors are intermixed in a useful way to overcome a technological issue. It should be understood that the principles of the present invention can be easily extendible to cover applications that are not mentioned herein. A person skilled in the art can make several modifications to the preferred embodiments described herein without departing from the spirit and scope of the invention or without undue experimentation. Accordingly, all such deviations, departures and modifications are deemed within the scope of the invention.

What is claimed is:

1. A plug-in program for execution with a first type of browser, comprising:
   computer code to download a plug-in program being designed and configured to allow processing of an event adapted for a second type of browser different than a first type of browser, the first type of browser being capable of detecting the event but not initially being adapted to process the event in a manner identical to that of the second type of browser;
   computer code to load a control component of the second browser into the first browser,
   computer code to intercept the event detected by the first browser, and
   computer code to process the event win the first browser using said loaded control component of the second browser.

2. The plug-in program of claim 1, wherein said computer code to process the event comprises computer code to transfer control of the execution of the first browser to the plug-in program so long as the first browser is pointed to a particular web site.

3. The plug-in program of claim 2, wherein the second type of browser, as manufactured, supports a component object model architecture.

4. The plug-in program of claim 2, wherein the first type of browser, as manufactured, does not support a component object model architecture.

5. The plug-in program of claim 4, wherein the second type of browser, as manufactured, supports a component object model architecture.

6. The plug-in program of claim 5 wherein the second browser is Internet Explorer.

7. The plug-in program of claim 6 wherein the first browser is Netscape Navigator.

8. A method, comprising:
   detecting whether a particular plug-in is installed in a first computer;
   if the particular plug-in is not installed in the client computer, downloading the particular plug-in to the first computer;
   loading the downloaded particular plug-in into a first type of browser, wherein the first type of browser does not support at least one feature of a second type of browser;
   generating an event within the first type of browser, wherein the event is adapted for the second type of browser;
   intercepting the event; and
   processing the event within the first type of browser using computer code contained in the downloaded particular plug-in in a manner that accommodates differences between the first type of browser and the second type of browser such that the at least one feature of the second type of browser is available via an interface of the first type of browser.

9. The method of claim 8, wherein the step of loading the downloaded plug-in comprising the step of:
   transferring control of the execution of the first browser to the plug-in program so long as the first browser is pointed to a particular web site.

10. The method of claim 9, wherein the second type of browser, as manufactured, supports a component object model architecture.

11. The method of claim 9, wherein the first type of browser, as manufactured, does not support a component object model architecture.

12. The method of claim 11, wherein the second type of browser, as manufactured, supports a component object model architecture.

13. The method of claim 12, wherein the second browser is Internet Explorer.

14. The method of claim 13, wherein the first browser is Netscape Navigator.

15. Computer executable program code stored on a computer-readable medium, comprising code to implement the method of claim 8.

16. At least one of a plurality of programmed computers configured to execute the program code of claim 15.

17. A computer program product stored on a computer readable medium for execution with a first type of browser, comprising:

a plug-in program being designed and configured to allow processing of an event adapted for a second type of browser different than a first type of browser, wherein the first type of browser is not initially adapted to process the event and does not support at least one feature of the second type of browser;

said plug-in program further being designed and configured to allow processing of the event within the first browser in a manner that accommodates differences between the first type of browser and the second type of browser such that the at least one feature of the second type of browser is available via an interface of the first type of browser.

\* \* \* \* \*

UNITED STATES PATENT AND TRADEMARK OFFICE
CERTIFICATE OF CORRECTION

| | | |
|---|---|---|
| PATENT NO. | : 6,477,550 B1 | Page 1 of 1 |
| APPLICATION NO. | : 09/270107 | |
| DATED | : November 5, 2002 | |
| INVENTOR(S) | : Balasubramaniam et al. | |

It is certified that error appears in the above-identified patent and that said Letters Patent is hereby corrected as shown below:

In the claims:
col. 9, line 66, replace "fbr" with --for--;
col. 10, line 8, replace "win" with --within--.

Signed and Sealed this

Fifteenth Day of February, 2011

David J. Kappos
*Director of the United States Patent and Trademark Office*